(No Model.)
A. F. C. GARBEN.
HUB ATTACHING DEVICE.
No. 333,621. Patented Jan. 5, 1886.
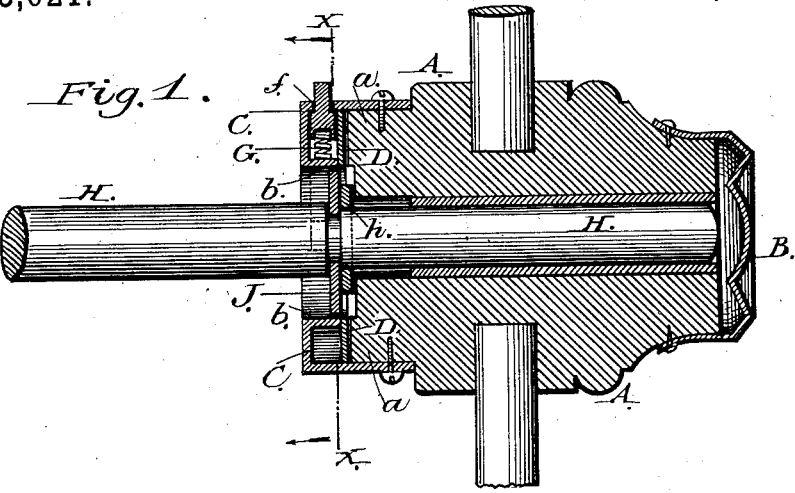
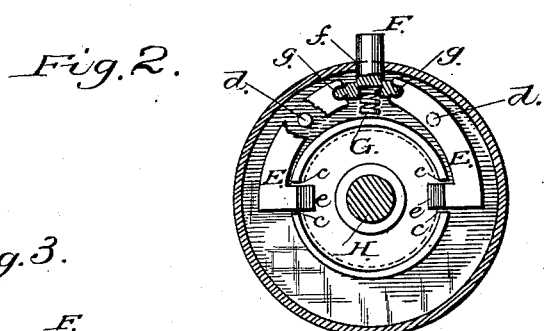
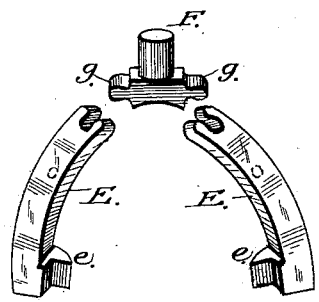
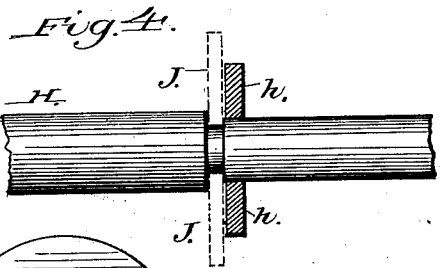
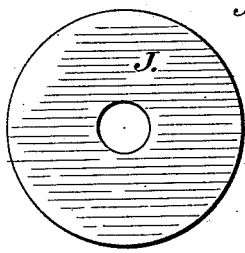
WITNESSES
T. Walter Fowler
H. B. Applewhaite
INVENTOR
Adolph F. C. Garben
per A. N. Evans & Co.
Attorneys

UNITED STATES PATENT OFFICE.

ADOLPH F. C. GARBEN, OF MINNEAPOLIS, MINNESOTA.

HUB-ATTACHING DEVICE.

SPECIFICATION forming part of Letters Patent No. 333,621, dated January 5, 1886.

Application filed May 27, 1885. Serial No. 166,818. (No model.)

*To all whom it may concern:*

Be it known that I, ADOLPH F. C. GARBEN, a citizen of the United States, residing at Minneapolis, in the county of Hennepin and State of Minnesota, have invented a new and useful Device for Attaching Hubs to Vehicles, of which the following is a full, clear, and exact description, reference being had to the accompanying drawings, forming part of this specification, in which—

Figure 1 represents a vertical longitudinal sectional view of a hub and spindle embodying my improvements. Fig. 2 represents a cross-sectional view on the line $x\,x$ of Fig. 1. Fig. 3 represents details of the locking mechanism. Fig. 4 is a detail of the spindle, showing the fast and loose collars and washer.

My invention relates to an improved means for fastening wheels to baby-carriages, velocipedes, boys' express-wagons, and similar conveyances, whereby the wheels may be readily attached to or detached from the axles without difficulty, and dispensing with the threaded spindle and nut now commonly used for the same purpose; and my invention consists, essentially, in a spindle having a loose collar, and in a locking mechanism of peculiar construction, all of which I shall hereinafter fully describe and claim.

To enable others skilled in the art to which my invention appertains, I will now proceed to describe its construction and the manner in which I have carried it out.

In the said drawings, A represents the hub of a baby-carriage or similar wheeled vehicle, which will be provided with the ordinary spokes and fellies, but which are not shown, as they may be of usual construction and form no part of my invention.

B represents a metallic cap or covering for the exterior of the hub, and protects the ends of the spindle from dust or other foreign matter.

The hub A is provided with a reduced portion, $a$, upon which is fitted and securely held, by means of screws or other suitable fastening devices, the hollow perforated cap C, which is bored to receive a spindle carrying a fixed and also a loose collar or washer, as I shall hereinafter describe. The cap C has an inwardly-projecting flange, $b$, which is transversely slotted at $c$, and between the flange $b$ and the inner periphery of the outside flange of the cap is secured the locking mechanism, the several parts of the same being held in position and protected from dust by a disk, D, as shown in Fig. 1. The cap C is also provided with pins $d$, upon which are fulcrumed the jaws E, which lock the hub to the spindle. These jaws are preferably curved, and at their lower ends are provided with catches $e$, which project through the slots in the flange $b$, while the upper ends of the jaws are notched or slotted, and adapted to engage suitable projections, $g$, upon each side of a vertically moving and actuating bolt, F. This bolt F passes through a perforation, $f$, in the cap C, and also engages a spring, G, interposed between the bottom of bolt F and the top of the flange $b$, and immediately forces the bolt and jaws back to their normal position, when the pressure is removed from the bolt.

The spindle H, in the present instance, is especially adapted to the locking mechanism just described, and is provided with a collar, $h$, which is firmly secured to the spindle. Within a suitable annular groove, and in close proximity to the collar, is loosely mounted a washer, J, which, when the spindle is inserted, engages the bevel faces of the jaws E, and forces these jaws backward sufficiently far to allow the washer to enter that portion of the cap C formed by the flange $b$, when the jaws are immediately thrown outward by the force of the spring G, and engaging the washer firmly hold the same, thereby dispensing with the friction and squeaking noise incident to many of the light vehicles now in general use, and also effectively preventing dust and other foreign substance from coming in contact with the lubricated portion of the spindle.

From the foregoing description it is manifest that wheels may be attached to the spindles of vehicles very securely, and with comparatively little inconvenience, which is not the case when the spindle is threaded and a securing-nut employed, as often the threads are imperfectly cut, and the wheels are liable either, in their rotation, to turn off the nut, or to tighten the same to such an extent as to prevent the wheels from revolving.

When it is necessary to detach the wheel to lubricate the spindle, it may be readily done by depressing the actuating-bolt F, which releases the jaws from their contact with the loose washer J, when the parts may be removed without further trouble.

The simplicity of construction and the ease with which the parts are disconnected is of great importance, as it enables ladies and children to attach or detach the wheel in a moment, and without any tool, and also facilitates the oiling of the spindle, which is a necessity, and cannot often be performed by ladies or children when nuts and wrenches have to be applied. This construction also enables dealers to save time and trouble in putting their articles together, and in other ways is superior to many of the devices employed for securing hubs to axles.

Having thus fully described my invention, what I claim as new, and desire to secure by Letters Patent, is—

1. In a device for attaching wheels to vehicles, a spindle, in combination with a loosely-mounted rotating washer, and suitable automatically-operating spring-jaws adapted to engage the washer and rotate the same by frictional contact, substantially as herein described.

2. The combination, with a spindle having a rigid collar, $h$, and an annular groove, of a loosely-mounted washer rotated by frictional contact with automatically-operating jaws, substantially as herein described.

3. In a device for attaching wheels to vehicles, a hub having automatically-operating spring-jaws, in combination with a spindle having a loose washer, whereby the spindle may be inserted within the hub and be held by means of the jaws rigidly engaging the washer, substantially as herein described.

4. An improved means for attaching or detaching hubs of wheeled vehicles to their spindles, consisting, essentially, in a spindle having an immovable collar, and a loosely-revolving washer, J, in combination with a hub having the automatically-operating jaws E and an actuating-bolt, F, having projections which engage the jaws, substantially as herein described.

5. The spindle H, having rigid collar $h$, and the loosely-revolving washer J, in combination with the hub A, the cap C, having the pins $d$, the automatically-operating curved jaws E, provided with catches, the bolt F, having projections which engage the slotted upper ends of the jaws, a spring, G, and a disk, D, substantially as herein described.

ADOLPH F. C. GARBEN.

Witnesses:
   J. RICHARDSON,
   JOHN F. BYERS.